(12) United States Patent
Suphachadiwong

(10) Patent No.: US 10,779,479 B2
(45) Date of Patent: Sep. 22, 2020

(54) BASKET FOR AN ORCHID PLANT HAVING AERIAL ROOTS

(71) Applicant: SUPHACHATWONG INNOVATION, CO, LTD., Bangphra, Chonburi (TH)

(72) Inventor: Thumrong Suphachadiwong, Chonburi (TH)

(73) Assignee: SUPHACHATWONG INNOVATION CO. LTD., Bangphra, Chonburi (TH)

( * ) Notice: Subject to any disclaimer, the term of this patent is extended or adjusted under 35 U.S.C. 154(b) by 342 days.

(21) Appl. No.: 14/913,725

(22) PCT Filed: Aug. 20, 2014

(86) PCT No.: PCT/IB2014/001577
§ 371 (c)(1),
(2) Date: Feb. 23, 2016

(87) PCT Pub. No.: WO2015/025213
PCT Pub. Date: Feb. 26, 2015

(65) Prior Publication Data
US 2016/0198642 A1    Jul. 14, 2016

(30) Foreign Application Priority Data

Aug. 23, 2013    (NL) .................................. 1040349

(51) Int. Cl.
*A01G 9/02*    (2018.01)
*B29C 45/00*    (2006.01)
(Continued)

(52) U.S. Cl.
CPC .......... *A01G 9/024* (2013.01); *B29C 45/0001* (2013.01); *B29K 2023/00* (2013.01); *B29L 2031/7004* (2013.01)

(58) Field of Classification Search
CPC .......... A01G 9/02; A01G 9/021; A01G 9/025; A01G 9/022; A01G 9/024; A01G 9/104; A01G 2009/003; A01G 5/00
(Continued)

(56) References Cited

U.S. PATENT DOCUMENTS 3,283,915 A * 11/1966 Maslow .................. A47J 47/16
                                                                        206/509
3,962,822 A *  6/1976 Walters ................ A01G 9/0295
                                                                           47/74
(Continued)

*Primary Examiner* — Peter M Poon
*Assistant Examiner* — Jeffrey R Larsen
(74) *Attorney, Agent, or Firm* — Gable Gotwals

(57) ABSTRACT

This invention relates to a basket (1) for cultivating an orchid plant (2) having aerial roots (3) and slots (4) for passing the plant's roots and/or leaves (2a). The basket is constituted by separate basket parts (5, 6), arranged to be interconnected at an interconnection interface (7), thus enabling to insert the plant's roots etc. in the basket parts' separated state, and to hold the plant's roots etc. in their joined state. The first basket part (5) comprises a bottom part (10) and three sides parts (11, 12, 13). The second basket part (6) comprises one side part (14) and is arranged to be connected to the first basket part in order to form the fourth basket side in the basket parts' interconnected state. The bottom part (10) and the two side parts (11, 13) extending towards the interconnection interface (7) comprise slots (4) which are open towards the interconnection interface (7).

7 Claims, 1 Drawing Sheet

(51) Int. Cl.
*B29K 23/00* (2006.01)
*B29L 31/00* (2006.01)

(58) Field of Classification Search
USPC .............................. 47/65.7, 66.7, 65.5, 66.1
See application file for complete search history.

(56) References Cited

U.S. PATENT DOCUMENTS

| | | |
|---|---|---|
| 6,098,337 A | 8/2000 | Chen et al. |
| 6,381,900 B1 | 5/2002 | Crowley |
| 6,615,543 B1 | 9/2003 | Palsrok |
| 9,420,750 B2 * | 8/2016 | Ito .......................... A01G 9/025 |
| 2004/0178704 A1 | 9/2004 | Saravis |
| 2007/0227066 A1 | 10/2007 | Crawford |
| 2008/0308439 A1 * | 12/2008 | Lidster ................... B32B 27/10 |
| | | 206/423 |
| 2013/0014435 A1 * | 1/2013 | Hansen ................. A01G 31/02 |
| | | 47/60 |

* cited by examiner

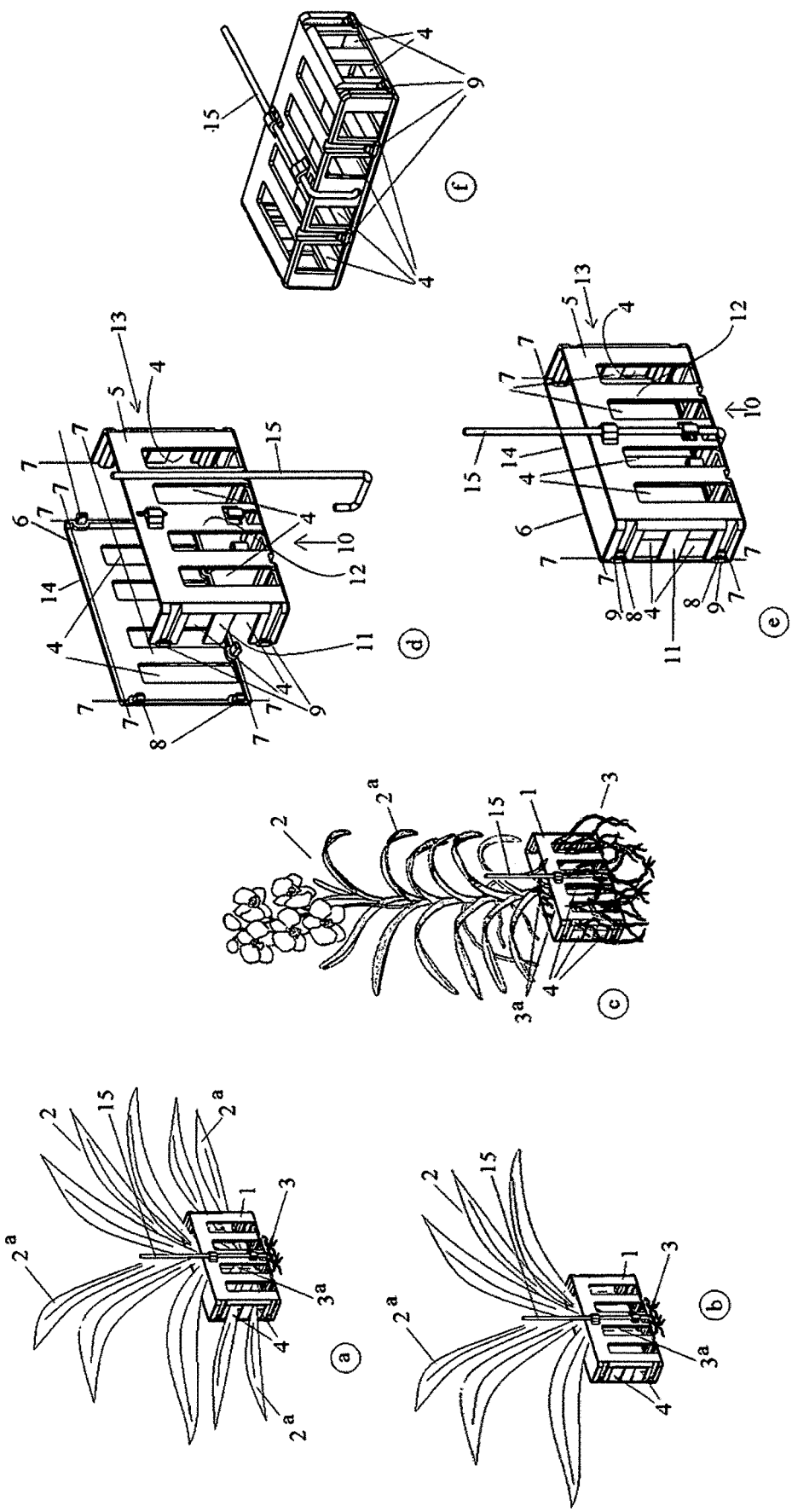

BASKET FOR AN ORCHID PLANT HAVING AERIAL ROOTS

CROSS-REFERENCE TO RELATED APPLICATIONS

This application is the United States National Phase of PCT Application No. PCT/IB2014/001577 filed 20 Aug. 2014, which claims priority to Netherlands Patent Application No. 1040349 filed 23 Aug. 2013, each of which is incorporated herein by reference.

The invention refers to a basket for an orchid plant having aerial roots, like e.g. Vandas or similar orchid plants having a monopodial growth habit.

Vascular plants with monopodial growth habits, like Vandas etc., grow upward from a single (base) point. They add leaves to the apex each year and the stem grows longer accordingly. Orchids with monopodial growth often produce copious aerial roots that often hang down in long drapes and have green chlorophyll underneath the grey root coverings, which are used as additional photosynthetic organs. They do not have a rhizome or pseudo bulbs so species adapted to dry periods have fleshy succulent leaves instead. Flowers generally come from the stem between the leaves. With some monopodial species, the stem (the rhizome) might fork into two, but for all monopodial orchids this is not necessary for continued growth, as opposed to orchids with sympodial growth.

Vanda is a genus in the orchid family (Orchidaceae) which, although not large (about fifty species), is one of the most important florally. This genus and its allies are considered to be the most highly evolved of all orchids within Orchidaceae. The genus is very highly prized in horticulture for its showy, fragrant, long lasting, and intensely colourful flowers.

The name "Vanda" is derived from the Sanskrit name for the species Vanda tessellata. These mostly epiphytic, but sometimes lithophytic or terrestrial orchids are distributed in India, Himalaya, SE Asia, Indonesia, the Philippines, New Guinea, southern China and northern Australia.

The plants possess leathery, drought resistant leaves, and some varieties terete leaf forms. Almost all of the species in this genus are very large epiphytes that are found in disturbed areas in habitat and prefer very high light levels, and the plants have large root systems.

The epiphytic species are best accommodated in baskets holding their aerial root systems. Disturbing or damaging the roots of large, mature Vandaceous orchid plants, and in particular, Vanda and Aerides species can result in the plants failing to flower and going into decline for a season or more. These plants do not tolerate disturbance or damage of their root systems in cultivation when they become mature.

Most growers prefer to grow Vandas in slotted baskets, where their roots are free to dangle toward the ground. Plants grown like this require a great deal of water, which may be given, in the greenhouses, via e.g. watering nozzles.

To place a Vanda or similar plant with an aerial root system into a basket, the roots must be weaved through the basket slots and the stem or plant base must be fixed to the basket by means of e.g. plant wire.

The slotted baskets used until now are made in one piece. Due to the width of the one-piece basket, required for smooth insertion of plants into the basket from above downwardly, plants may, as long as their (young) roots do not provide sufficient handhold to the basket, easily topple or even fall out of their baskets during their transportation through the greenhouse, watering (by nozzles spraying water under pressure), administration of crop protection means etc. Therefore each young plant has to be fixed in its basket by a plant wire or similar means, which, however, is time consuming. Besides, this measure, as turns out in practice, is not a terminative solution for the problem of toppling or falling of the plants.

One aim of the present invention is to provide a basket which avoids the disadvantages of the prior art one-piece baskets, especially to provide a basket in which the (young) plant stands much more stable than in a (wide) prior-art basket.

A particular aim is to provide such basket for plants with aerial roots, which provides that the basket is able to be attached to the base part of the plant, i.e. the plant part where its roots and/or first leaves originate, by moving at least two basket parts, forming together the novel and improved plant basket, towards each other from both sides of the plant, thus embracing the base part of the plant. After the basket parts have been mounted together around the plant's base part, the plant may be hung—in the same way as the prior-art one-piece baskets—in e.g. a greenhouse by means of a long hook which is attached to the (mounted) basket. The plant may be handled and cultivated further while its roots hang freely downward through the basket slots.

The invention thus provides a basket for e.g. an orchid plant having aerial roots and e.g. a monopodial growth habit, like e.g. Vanda, X Ascocenda, Ascocentrum, Aerides etc., the basket having slots or other openings arranged for passing protruding plant parts like the plant's aerial roots and/or leaves, wherein the basket is constituted by at least two separate basket parts which are arranged to be releasably (reversibly) or not-releasably (not-reversibly) interconnected (assembled, mounted, joined) to one another at an interconnection interface (e.g. one common interconnection plane or several, e.g. staggered interconnection planes), thus enabling and facilitating to insert the plant's aerial roots etc. (its base part), or any other protruding plant parts, in the non-assembled state of the basket, and to hold the plant's aerial roots or other protruding plant parts in the assembled state of the basket, i.e. the state wherein the basket parts are interconnected. It is preferred that the interconnection plane of both basket parts is mainly vertical (where the plant's roots extend mainly downwardly and the plant's stem mainly upwardly).

Where in this document, including its claims, mention has been made of "aerial roots" or "roots", any other protruding or outgrowing plant parts are deemed to be included in the definition of those terms, e.g. the plant's leaves etc., which protruding plant parts also may be inserted into the basket openings in order to fixate the plant and the basket one another. In many cases it will be preferred to insert the plant's protruding parts in or around the plant base or plant centre, i.e. the area where the roots and/or first leaves originate.

Due to the two (or more) basket parts which can be brought into embracement of the base part (roots etc.) of the plant by moving those parts from aside, the basket itself can be much narrower than the (wide) prior-art baskets. Due to this young plants will stand much more stable in their (rather narrow) baskets without need to be fixated by fixation means like plant wire etc. Notwithstanding the absence of such fixation means, the plants, mounted into the novel two (or more) part plant baskets, will not tend to fall into a slanting position or be blown (e.g. by the watering nozzles) out of their baskets.

According to a further elaboration of the invention, at least one basket part comprises open slots at one or more of its sides and/or bottom, which are open towards their interconnection interface (and are, in other words, open-ended towards their interconnection interface to their counterpart). In this preferred embodiment the base part of the plant, i.e. its roots and/or its first leaves will, by moving the basket parts towards another, be received (introduced) into the open ended slots of at least one basket part and be embraced, as it were, by the flanking slot edges. In other words, the roots (and/or possibly the first leaves) of the plant can be introduced very easily and smoothly into the inside of those slots and thus into the basket: due to the basket's open slots (open at one side, i.e. towards its interconnection interface to the half basket's counterpart) the sides of the baskets act, as it were, as "forks", facilitating smooth and easy (embracing) reception/introduction of the plant's root and/or first leaves parts.

The basket parts may comprise releasable fixation means, arranged for reversibly interconnecting (assembling) and non-destructively disconnecting (disassembling) the basket parts, by which the basket parts can be mounted and dismounted again in a later stage. The basket parts may, alternatively, comprise non-releasable fixation means, arranged for irreversibly interconnecting the basket parts, causing that the basket parts can be mounted (interconnected) once, but cannot be dismounted in a later stage. Dismounting, however, may not be necessary, even not when the plant gets mature (and its roots become thicker), as normally the slots will offer sufficient room for all roots. An advantage of the irreversible interconnection option is that the chance of unintentional disconnection of the basket parts will be less than when using a reversible, dismountable construction.

In both options the fixation means may be clickable, which kind of fixation means are of general knowledge as such within the areas of constructions and products made from plastics. The basket parts may be manufactured by injection moulding of e.g. a polyolefin type plastic like polyethylene or polypropylene.

It may preferred that the basket parts are equal to each other, which may be advantageous in view of their production (equal moulds, processing, storing and handling) and in view of their application in the plant processing during the plant insertion stage, as both basket parts are fully interchangeable.

A preferred embodiment of the basket, which will be discussed below, comprises two basket parts, the first basket part mainly comprising a basket bottom part and three basket side parts and the second basket part mainly comprising one basket side part, where the second basket part is arranged that it can be connected to the first basket part in order to form the fourth basket side in the basket parts' mounted, i.e. interconnected state. In this preferred embodiment the basket bottom part and the two basket side parts of the first basket part, extending towards the interconnection interface, comprise slots which are open at their ends towards the interconnection interface, thus facilitating the insertion of the aerial roots via the open ends of those open-ended slots.

It is noted that U.S. Pat. No. 6,098,337 discloses a basket intended for cultivating orchids, including more or less slot-like openings which, however, are not shaped as open-ended "forks" like the basket according to the invention which, due to their design including open-ended, fork-like slots, will facilitate a smooth and easy reception of the plant's root and/or relevant leaves parts.

Hereinafter the invention will be elucidated on the basis of some exemplary embodiments, with reference to some figures.

FIGS. 1a-f illustrate a preferred embodiment of the basket according to the invention.

FIGS. 1a-f show a basket 1 for cultivating and/or growing a Vanda or similar plant 2 having aerial roots 3. The basket 1 has slots 4 or other openings arranged for passing the plant's aerial roots 3. The basket 1 is constituted by two separate basket parts 5 and 6, which are arranged to be interconnected to one another at an interconnection interface 7, thus enabling and facilitating the insertion of at least the plant's aerial roots 3 (illustrated in FIGS. 1b and 1c) and possibly some of its leaves 2a (illustrated in FIG. 1a), forming the base part or base region 3a of the plant, in the basket parts' separate (not-interconnected) state (shown in FIG. 1d), viz. via the open ends of the root slots 4 (directed towards basket part 6), and, after interconnecting both basket parts 5, 6, to hold the plant's aerial roots 3 and further base part 3a in the joined (interconnected) state/position of the basket parts 5 and 6 (shown in FIGS. 1e-f) when the open slots are closed by basket part 6.

Basket part 5 comprises open slots 4 in two of its side walls as well as in its bottom wall, which slots 4 are open towards the interconnection interface 7, enabling an easy insertion of the sensible aerial roots 3.

In order to interconnect and secure the basket parts 5, 6 to another the basket parts 5, 6 comprise clickable fixation means, e.g. constituted by a hook 8 and loop 9 arrangement, arranged for interconnecting both basket parts 5, 6. Depending on the detailed implementation of the fixation means (especially its hooking angle), the fixation of the basket parts 5, 6 will be reversible/releasable, by which the connection can be reopened, or irreversible/not-releasable, in which case the connection cannot be opened again.

In the embodiment shown in FIGS. 1a-f the basket parts are not equal to each other. The basket 1 shown in FIGS. 1a-f thus comprises two basket parts 5 and 6, the first basket part 5 mainly comprising a basket bottom part 10 and three basket side parts, i.e. the sides 11, 12 and 13. The second basket part 6 mainly comprises one basket side part 14. The second basket part 6 is arranged that it can be connected to the first basket part 5 in order to form—by means of basket side part 14—the fourth basket side in the joined, i.e. interconnected state of the basket parts, shown in FIGS. 1e-f. The basket bottom part 10 and the two basket side parts 11 and 13, extending towards the interconnection interface 7, comprise slots 4 which are open at their ends towards the interconnection interface 7, thus enabling an easy, quick, efficient and convenient introduction of the sensible aerial roots 3 during the start stage of the plant production process, which root introduction is followed by closing and securing the basket parts 5 and 6, thus forming an innovative plant basket 1.

Finally, the joined basket 1 can be provided with a hanging hook 15 which is used to hang the plant 1 in its growing or cultivating environment.

The invention claimed is:

1. A basket for an orchid plant having aerial roots, the basket comprising two asymmetrical basket parts;
   a first basket part of the two asymmetrical basket parts including:
      a planar bottom end,
      a planar side wall oriented normal to the planar bottom end, and
      two planar end walls each oriented normal to the planar bottom end and the planar side wall;

the planar bottom end and the two planar end walls each including a first fixation means located on a respective side opposite of the planar side wall of the first basket part and the planar bottom end and the two planar end walls each containing opened-ended rectangular-shaped slots, a respective open end of each open-ended rectangular-shaped slot being located on a respective side opposite the planar side wall;

the planar side wall having closed-ended rectangular-shaped slots, the planar bottom end forming a closed end of the closed-ended rectangular shaped slots of the planar side wall; and a second basket part of the two asymmetrical basket parts including:
one planar wall with closed-ended rectangular-shaped slots and second fixation means complementary to that of the first fixation means;

wherein when the first and second basket parts are interconnected by the first and second fixation means:
the one planar wall of the second basket part is oriented normal to the planar bottom end, parallel to the planar side wall, and normal to the two planar end walls of the first basket part; and the one planar wall of the second basket part closes an open end of each open-ended rectangular-shaped slot on the respective side of the planar bottom end and two planar end walls of the first basket part.

2. The basket according to claim 1 wherein the first and second fixation means (8, 9) are releasable and arranged for reversibly interconnecting and non-destructively disconnecting the first and second basket parts.

3. The basket according to claim 1, wherein the first and second fixation means (8, 9) are non-releasable and arranged for irreversibly interconnecting the first and second basket parts.

4. The basket according to claim 1, wherein the first and second fixation means (8, 9) are clickable for interconnecting the first and second basket parts.

5. The basket according to claim 1, manufactured by injection moulding material selected from the group consisting of a thermoplastic synthetic polyolefin type plastic.

6. The basket according to claim 5, wherein the polyolefin type plastic is selected from the group consisting of polyethylene and polypropylene.

7. An orchid plant basket, the plant having aerial roots, the basket comprising:
a first basket part including:
one vertical planar side wall containing a plurality of vertically arranged rectangular slots each with one end being open toward a bottom end of the one vertical planar side wall and closed at a top end of the one vertical planar side wall;
a horizontal planar bottom end containing a plurality of rectangular-shaped slots each with one end being open and one end being closed, with each closed end being connected and arranged perpendicular to the opened ended rectangular-shaped slots of the one vertical planar side wall;
two vertical planar end walls, each wall containing a plurality of horizontally arranged rectangular-shaped slots, each slot having one end being open and one end being closed, the closed ends being attached to the one vertical planar side wall;
a second basket part including:
one vertical planar side wall having a plurality of vertically arranged rectangular-shaped closed ended slots;
a plurality of fixation means configured to reversibly interconnect and disconnecting the first and second basket parts, the plurality of a fixation means including first fixation means having a hook, and second fixation means having a loop being complementary to that of the first fixation means; the first fixation means being connected to either the first or second basket parts, and the second fixation means being connected to the complementary first or second basket parts; and
wherein when the second basket part is interconnected with the first basket part, a basket for holding an orchid plant is formed having an open top, four sides and a bottom, the four sides and bottom each having closed ended slots formed therein.

* * * * *